Patented Sept. 14, 1926.

1,599,627

UNITED STATES PATENT OFFICE.

WILLIAM ACHTMEYER, OF MIDDLETOWN, CONNECTICUT, ASSIGNOR TO THE RUSSELL MANUFACTURING CO., OF MIDDLETOWN, CONNECTICUT, A CORPORATION OF CONNECTICUT.

MANUFACTURE OF INDURATED MATERIALS AND ARTICLES.

No Drawing. Original application filed December 27, 1919, Serial No. 347,798. Divided and this application filed April 9, 1920. Serial No. 372,508.

My invention relates to manufacture of indurated materials and articles; and it comprises novel processes of preparing such materials and articles, as well as the resultant novel materials and articles themselves.

In my co-pending application Serial No. 347,798, filed December 27, 1919, of which the present application is a division, I have disclosed and claimed a novel process of preparing so-called phenol-aldehyde condensation products, which products are in themselves novel and are especially well adapted for employment in practicing the invention of the present application. In certain of its broader phases, the invention disclosed and claimed in the present application is not restricted to the employment of phenol-aldehyde condensation products obtained according to the novel procedure forming the subject matter of the claims in my prior application aforesaid, as will hereinafter appear; and the claims hereinafter made are to be interpreted accordingly. However, the condensation product resulting from the process claimed in my aforesaid prior application are especially well adapted for the manufacture of useful indurated materials and products, particularly those characterized by pronounced frictional qualities, in the fabrication of clutch facings, brake linings, and the like; and in order to afford a full understanding of the most desirable way of practicing the present invention, a description of the aforementioned novel process of preparing phenol-aldehyde condensation products will be given herein, in conjunction with a description of how such products can be utilized in the manufacture of indurated materials and articles, which latter constitutes more particularly the subject matter of the present application.

It is well known that by heating or boiling mixtures of phenolic bodies and aldehydes, for example by thus treating a mixture of phenol or a homologue or other derivative thereof, such as cresol, with formaldehyde or a polymer thereof, such as paraformaldehyde, trioxymethylene, etc. or, in general, a reactive methylene compound, at sufficiently high temperature and for a sufficiently long time, chemical condensation takes place. Under ordinary conditions and especially in the absence of an accelerating agent or catalyst of some kind, the reaction is too slow and is also too difficult to control with the certainty necessary for successful commercial practice. It is also known that condensation products useful for various purposes may be obtained by conducting the described reaction in the presence of a base as a condensing agent. It has also been attempted to use acids as condensing or catalytic agents, but as heretofore practiced the resultant reaction is much too violent and is apt to get entirely beyond control.

According to the process disclosed in my prior application aforesaid, the difficulties inherent in the proposed use of acids as condensing agents are entirely overcome by the use of a small amount of an acid ester as the condensing or catalytic agent. Furthermore, the resultant condensation products obtained are distinguishable from those obtained by the use of a basic condensing agent and are superior thereto for certain purposes hereinafter more fully pointed out. The use of an acid ester, and most desirably a mineral acid ester, in properly restricted amounts in the phenolaldehyde reaction mixture, renders it possible to carry out the reaction expeditiously with smoothness and uniformity, and to control it at all stages.

In a specific example illustrating one especially desirable mode of preparing phenol-formaldehyde condensation products for use in the manufacture of friction devices, I may react upon a phenolic body, such as commercial phenol, with formaldehyde, in the presence of a mineral acid ester, the phenol and formaldehyde being present in approximately equi-molecular proportions, or still better with formaldehyde in excess. In practice it is well to use approximately equal volumes of phenol and a 40 per cent formaldehyde solution, which gives a suitable excess of formaldehyde. In the mixture is incorporated a small amount of a mineral acid ester as a condensing agent, the amount of which in any case should be substantially less than the molecular equivalent. Among mineral acid esters suitable for the purpose may be mentioned those of amyl, methyl, ethyl and other alcohols, the hydrochloric acid esters being most desirable. The hydrochloric acid ester of amyl alcohol is particularly suitable as a condensing agent in practicing the process; and it is most desirable to use the pure ester which has been distilled from amyl alcohol saturated with hydrochloric acid gas. I have found that the use of such distilled ester in very small quantities, say as little as one-half of one per cent of the weight of the phenolic body used, is particularly effective in ensuring rapid but smooth and controllable reaction. Or, I may employ a mixture of amyl alcohol with hydrochloric acid (preferably of constant boiling concentration), using say one-quarter to one ounce of such mixture to each pound of phenol. The reaction mixture is heated in a suitable vessel, most desirably provided with a return condenser. The proportion of the acid ester may be varied considerably but should always be substantially less than the molecular equivalent. In some cases, the quantity employed may amount to as much as 10 per cent of the weight of the phenolic body used; but ordinarily a smaller amount is effective and is preferred.

The mixture being heated in a suitable vessel under a reflux condenser, the reaction starts quickly, the mixture becoming turbid owing to the separation of water. The reaction proceeds smoothly and without violence, and is completed in a short time, say 15 to 20 minutes in a typical instance. The reaction mixture separates rapidly and cleanly into two layers, one a light-colored creamy viscous heavy portion which settles to the bottom of the heating vessel, and the other a lighter liquid containing hydrochloric acid (liberated from the ester) and water formed during the reaction and added with the reagents. The lower layer of fluid viscous material is thick and pasty rather than oily. It contains the resultant initial condensation product, soluble in acetone, alcohol, etc.; and it also contains amyl alcohol derived from reaction of the acid ester with water, an advantageous circumstance, as will appear presently. By further boiling, the condensation mass may be made to acquire a more pasty character, or even to become semi-solid in consistency.

The reaction having been completed as indicated by prompt and clean separation of the mixture into two layers upon cessation of boiling, the supernatant watery layer may be separated in any suitable manner from the lower layer containing the viscous condensation product. A peculiar and highly desirable characteristic of the initial condensation product thus obtained is that it is practically neutral in reaction and hence requires no washing to remove acid, a distinct advance in this respect over processes heretofore proposed.

After separation, the viscous mass may be transformed directly with the aid of heat into a solid body; or it may first be dissolved in an alcohol, acetone or other suitable solvent, or in a mixture of two or more such solvents; and the solution thus obtained used to impregnate absorbent or fibrous materials of any character or form desired. The impregnated material or article thus prepared may, after expelling all the solvent, be gradually heated to transform the condensation product into solid form. By whichever method the final solid product is obtained, it is non-inflammable, unaffected by water, oils or alcohol, and is resistent to acids and alkalies. It is also infusible in the sense that it merely chars upon being subjected to a flame, for example, without actually melting. It may, however, be distinguished from the solid product obtained by condensing phenol and formaldehyde with the aid of a basic condensing agent by its containing no alkali or alkali salt and by its being tougher and less brittle than is the product obtained by the basic condensation method. This property renders it highly valuable for special purposes where the harder and more brittle material of the prior art would not be sufficiently resistant to shock and vibration.

If the condensed mass in the viscous form be associated with solvents of low volatility, such as acetanilid, certain essential oils containing phenolic compounds, or esters of phenols, cresols, and naphthols, and especially with an alcoholic solution of thymol and castor oil, an additional degree of plasticity and pliability is imparted to the finished condensation product when it has been transformed into a solid. In the last mentioned solvent, thymol is used to prevent the castor oil from precipitating out. While the proportions may be varied considerably to meet requirements, it has been found desirable to use from 10 to 3 parts by weight of castor oil with from 90 to 97 parts of the initial condensation product. In actual practice, where a solvent of low volatility, such as those mentioned, is to be employed, it is best first to thin down the viscous condensed mass with an alcohol, such as wood alcohol or denatured grain alcohol, and then to incorporate the solvent of low volatility.

The solidified condensation product, especially when prepared by heating mixtures including a low volatility solvent, has a wide variety of uses. It is a non-conductor and may therefore be employed either alone or in mixture with suitable filling material, such as asbestos, wood fiber, pulp, or other fibrous or absorbent material, for general insulating purposes and the like. It is also of great value in the manufacture of friction materials and surfaces, as for example in the manufacture of brake linings, or linings for brake shoes, clutch disks and facings, etc. For example, by compounding the fluid condensation product with asbestos fiber and a friction-augmenting body or material, with or without the addition of rubber or other materials, an ideal material for brake linings, etc. may be produced. Under the head of friction-augmenting material, that is, material which serves to increase the coefficient of friction, may be mentioned formaldehyde-aniline (anhydroformaldehyde-aniline) especially; and among other agents having analogous but specifically different action may be mentioned diphenyl-methane derivatives such as methylene-diphenyl-diamine. Such compounds may of course be produced directly in the mixture, if desired, by incorporating the proper proportion of aniline or other suitable amine with the proper proportion of formaldehyde and effecting reaction under appropriate conditions; or the compound resulting from combination of such amine and formaldehyde may be added as such to the mixture, or otherwise embodied or incorporated in the final condensation product as will appear later. The proportions of the friction-augmenting material or materials used may be varied considerably, and in any given instance will depend largely upon the purpose for which the mixture is designed. In the case of a mixture suitable for making clutch disks and facings, the employment of 10 pounds or more of anhydroformaldehyde-aniline to 100 pounds of asbestos fiber gives good results; while for brake linings a somewhat larger proportion is generally advisable. For brake linings, moreover, it is sometimes desirable to use methylene-diphenyl-diamine because of the greater flexibility which this agent confers upon the final condensation product. Generally speaking the addition of from 5 to 25 per cent of friction-augmenting material, based on the weight of asbestos fiber in the mixture, is found to be a good working range.

Where the friction-augmenting agent is to be produced directly in the condensation mixture, an excess of formaldehyde, proportional to the amount of such agent that it may be desired to have present in the final condensation product, may be employed in the initial reaction mixture. The excess available in a mixture of equal volumes of formalin and phenol is suitable in a typical instance. When such a mixture containing a mineral acid ester is boiled as already described, the supernatant watery layer formed is somewhat milky, owing to the suspension therein of very finely divided polymerized formaldehyde or paraform $(HCOH)_2$, which, upon cooling of the mixture, separates as a soft, white flocculent mass resting on the upper surface of the heavy viscous lower layer. The supernatant watery layer may be separated in any suitable manner, as before, from the lower layer containing the viscous condensation product. If a relatively soft final condensation product be desired, the paraform thus deposited may also be removed and rejected. But in the present specific example, it is assumed that a hard tough final condensation product having enchanced frictional properties is sought, and accordingly the paraform is thoroughly mixed with the mass of soluble condensation product, alcohol or acetone, or both, being usually added as a solvent. To this mixture is then added the approximate quantity of aniline necessary to combine with the paraform to form anhydroformaldehyde-aniline $(CH_2NC_6H_5)_3$, a compound of the methylene-aniline type. This compound, which is a brittle resinous material with excellent friction characteristics and a rather high melting point, around 140° C., appears to be formed by a polymerzing reaction between the aniline and formaldehyde or paraform, with self-heating and splitting off of water. Said compound, however, by the use of proper solvents such as those specified, will remain in solution in the soluble condensation mass. When the resultant mixture is subjected to further heating, either alone, or mixed with other materials, or incorporated in shaped or other masses of absorbent material, in the manner already fully set forth above, a very hard tough condensation product results which has greatly augmented frictional properties, and which is correspondingly effective in the production of compositions and articles of superior frictional characteristics. Morever, when prepared as above described, it is free from acid and contains no free aniline or other base, a highly important consideration where the product is to be used in contact with metal.

I have found that the result just described is not attained where an alkaline condensing agent, such as sodium hydroxid, is present in the initial condensation product, the reason apparently being that where free alkali is present even in small quantity, the excess of the formaldehyde and the alkali in solution in the soluble condensation mass combines with the aniline to form methylene-diphenyl-diamine $CH_2(NHC_6H_5)_2$. This compound is a soft, pasty and sticky mass which, while well adapted for use as a friction-augmenting agent in certain embodiments of the invention, does not give a final product of the hardness and toughness attainable by employing anhydroformaldehyde-aniline. On the other hand, where no alkali is present and where the amount of aniline used is only about sufficient to combine with the excess formaldehyde or paraform, the aniline does not have a softening effect, but on the contrary imparts hardness and toughness to the ultimate condensation product by formation of the formaldehyde-aniline compound, as already explained.

The procedure described above, in which paraform is produced by using an excess of formaldehyde over the amount molecularly equivalent to the phenolic body employed, may be conducted in such a way as to result in still further advantages. For example, in removing the upper watery layer after the paraform has settled out upon the upper surface of the lower viscous layer, I may leave a very small quantity of the slightly acid watery layer and may subsequently add a slightly greater amount of aniline than is necessary to combine with the paraform. The slight excess of aniline combines with the trace of hydrochloric acid, purposely left in the mixture in this instance, to form aniline hydrochlorid. I have found that the presence of a very small percentage of aniline hyrochlorid in the mixture greatly accelerates the subsequent transformation into the final hard insoluble condensation product. For example, using aniline hydrochlorid in an amount equal, for example, to from 1 to 2 per cent of the weight of the soluble condensation mass, the mass, upon application of heat, is transformed into a final hardened product several times as rapidly as where the aniline salt is not present. A larger amount of the aniline salt may be used, but is not necessary. In practice, a mass of soluble condensation product may be dissolved in suitable solvents such as alcohol, acetone, or the like, or in mixtures of such solvents, in company with aniline hydrochlorid, and the mixture used to impregnate fibrous or other absorbent materials or articles to be indurated, the solvent being first expelled in suitable drying rooms, at temperatures of say 35 to 50 degrees C. The articles are then most desirably subjected to further heating at hardening temperatures of say from 75° up to 160° C., the temperature being raised very gradually in order to avoid expelling amyl alcohol present, the retention of amyl alcohol being desirable as contributing an advantageous degree of pliability in the final hardened product or article. Assuming the treatment of impregnated sheet material about one-fourth of an inch thick, for example, the hardening is ordinarily completed under these circumstances in about 15 minutes or thereabouts, that is, several times as rapidly as in the absence of the aniline hydrochlorid.

A very important characteristic of the soluble condensation mass or product obtained as hereinbefore described with the aid of a non-alkalin condensing agent, specifically a mineral acid ester, is that it contains substantially no water, free formaldehyde or other substance which will liberate disturbing gaseous or volatile by-products when the condensation mass is subjected to heat for conversion thereof into the final insoluble product. By virtue of this characteristic, the employment of counter-pressure to prevent blistering or deformation of shaped masses of the soluble condensation product, or of shaped articles of absorbent material impregnated with a solution of said soluble condensation product, is rendered unnecessary. It will be apparent that this greatly simplifies the manufacturing procedure, which heretofore required employment of pressure during the final hardening treatment to avoid swelling and porosity of the final hardened product. Fibrous or absorbent material of any kind impregnated with a solution of my novel soluble condensation product in alcohol or acetone, for example, can be directly subjected in an oven to relatively high heat at ordinary atmospheric pressure without becoming porous or forming blisters; but it is better in practice first to expel the solvent at a moderate drying temperature as above specified, and then to gradually increase the heat to the final hardening temperature. The resultant indurated articles thus prepared without the use of pressure are entirely free from defects such as blisters, sponginess, etc., and from irregularity or deformation of any kind.

The foregoing statements also hold true where, in the process of the present invention, more formaldehyde is used in the initial reaction mixture than will combine with the phenol; for under these circumstances the excess of formaldehyde is converted into paraform as described and paraform, unlike formaldehyde, will not liberate disturbing gaseous or volatile by-products during the final heating; so that although paraform be present in the mixture during the final heating, the use of pressure to prevent swelling, blistering, etc., is not required. The same thing holds true also for cases in which aniline is added to combine with the paraform.

The foregoing important characteristics of the novel soluble condensation product obtained in accordance with the present process are in marked contrast to the characteristics of soluble condensation products heretofore obtained with the aid of alkaline condensing agents, such as caustic soda. When caustic soda is used as a condensing agent, the reaction mass does not separate cleanly or rapidly into two layers, and a considerable proportion of water remains in the mass of soluble condensation product, separating therefrom only upon standing for several weeks. If more formaldehyde is used than is molecularly equivalent to the phenol employed, this also remains unchanged in the mass of condensation product. If absorbent material be impregnated with an alcoholic or other solution of this soluble condensation mass, and the solvent first expelled by gentle heating it is impossible to effect the final hardening treatment without the use of counteracting pressure, because the outer surface of the impregnated material becomes hardened before all the water and formaldehyde can escape. If superatmospheric pressure were not employed therefore, the articles composed of the impregnated material would swell and become porous and practically worthless for most technical purposes. The possibility of dispensing with the use of counteracting pressure is therefore a very important result achieved by the present invention.

It will also be understood that while it is convenient and most desirable to produce anhydroformaldehyde aniline or other friction-augmenting agent in the soluble condensation mass in the manner described, it is also permissible within the invention to add the agent, as such, to the soluble condensation mass.

By employing anhydroformaldehyde-aniline in the manner herein described, not only is a materially harder final condensation product obtained, but its frictional quality is remarkably augmented by the presence of the formaldehyde-amine derivative or product. The product is therefore especially adapted for the production of friction compositions and the embodiment of the same in articles such as clutch discs, clutch facings, brake linings, etc., which can be impregnated with the soluble condensation mass and then hardened as described. The resultant friction surface is of excellent character, and under the hardest service will not become gummy or glassy, and consequently will not stick or slip, a characteristic of the highest importance in this type of article.

In another specific application of the invention, sheets may be formed of asbestos or wood fiber mingled with shredded cork, and such sheets impregnated with the viscous condensation products which may or may not contain a special friction-augmenting agent, and which should ordinarily be first dissolved in alcohol, acetone, or the like, with or without a softening agent such as a low volatility solvent, to facilitate impregnation of the sheet. By preliminarily drying and then gradually heating the impregnated sheet up to from 100° to 160° C. (where the thymol-castor oil softener is used), a product results which is well adapted as a substitute for linoleum, and which can also be used for floor covering generally, for covering automobile running boards, etc. On account of the non-inflammability of the material and its being unaffected by water, it is far superior to linoleum. Mixtures suitable for floor covering may also include fillers, such as wood pulp, paper pulp, sawdust, etc., of an absorbent nature, which are incorporated in the mixture prior to hardening of the condensation product by heating.

Shaped articles may be cut or stamped out of unimpregnated sheets formed from mixtures such as those above described, the shaped articles then impregnated with the condensation product in fluid condition, and then heated as described to render the condensation product hard and insoluble. This results in the production of articles useful for many purposes such, for instance, as automobile cone clutches, disc clutch facings, brake linings, etc.

It is apparent that the non-brittle character of the final solidified condensation product prepared in accordance with the process of my invention, together with its toughness and resistance, renders it particularly suitable for use where it may be subjected to severe shock and vibration. This condition prevails notably in the practical use of clutch facings, brake linings, etc.

What I claim is:

1. The process of preparing useful indurated articles which comprises reacting between a phenolic body and formaldehyde in the presence of a condensing agent to produce a soluble condensation product, treating fibrous material with a solution of said product containing admixed castor oil the proportion of castor oil amounting to not more than about one-ninth of the weight of said condensation product, and heating to harden said condensation product.

2. The process of preparing useful indurated articles which comprises incorporating with a soluble phenolic condensation product an alcoholic solution of castor oil containing thymol, and thereafter heating to harden said condensation product.

3. The process of preparing useful indurated articles which comprises incorporating castor oil with a soluble phenolic condensation product and hardening the resulting composition with the aid of heat, the proportion of castor oil amounting to not more than about one-ninth of the weight of said condensation product.

4. The process of preparing useful indurated articles which comprises incorporating with a soluble phenolic condensation product fibrous material and an alcoholic solution of castor oil the proportion of castor oil amounting to not more than about one-ninth of the weight of said condensation product, sheeting the mixture, and hardening with the aid of heat.

5. The process of preparing useful indurated materials and articles which comprises incorporating with absorbent material a mixture comprising a soluble phenolic condensation product, formaldehyde-anilin amounting in quantity to at least about 5 per cent by weight of said absorbent material, and a small amount of an aniline salt, and hardening with the aid of heat.

6. The process of preparing useful indurated materials and articles which comprises reacting upon a phenolic body with an excess of a reactive methylene body in the presence of a non-alkaline condensation agent to obtain a soluble condensation product, incorporating with the condensation product and the excess of such methylene body an amine compound and a solvent for the mixture, impregnating absorbent material therewith, and hardening the resultant composition with the aid of heat.

7. The process of preparing useful indurated materials and articles, which comprises reacting upon phenol with an excess of formaldehyde in the presence of a mineral acid ester to obtain a soluble condensation product, separating watery products from the reaction mass, incorporating with the residue a quantity of aniline only about sufficient to combine with the excess formaldehyde present and a solvent for the mixture, impregnating absorbent material therewith, and heating to harden the resultant composition.

8. The process of preparing useful indurated materials and articles, which comprises reacting upon phenol with an excess of formadehyde in the presence of a mineral acid ester to obtain a soluble condensation product, imperfectly separating watery products from the reaction mass, mixing with the residue a quantity of aniline only about sufficient to combine with the formaldehyde present and the acid contained in such watery products as are retained, thinning down the mixture with a suitable solvent, impregnating absorbent material with the solution, and heating to harden the resultant composition.

In testimony whereof I hereunto affix my signature.

WILLIAM ACHTMEYER.